US005714902A

United States Patent [19]

Comer

[11] Patent Number: 5,714,902

[45] Date of Patent: Feb. 3, 1998

[54] POLYNOMIAL FUNCTION GENERATION CIRCUIT

[75] Inventor: Donald T. Comer, Mapleton, Utah

[73] Assignee: Oak Crystal, Inc., Mount Holly Springs, Pa.

[21] Appl. No.: 565,389

[22] Filed: Nov. 30, 1995

[51] Int. Cl.[6] .................... G06F 7/556

[52] U.S. Cl. .................... 327/346; 327/350

[58] Field of Search .................... 327/346–350; 323/315

[56] References Cited

U.S. PATENT DOCUMENTS

| | | | |
|---|---|---|---|
| 4,081,696 | 3/1978 | Oda et al. | 327/349 |
| 4,524,292 | 6/1985 | Nagano | 327/347 |
| 4,560,959 | 12/1985 | Rokos et al. | 331/176 |
| 4,777,471 | 10/1988 | Comer | 341/118 |
| 4,814,724 | 3/1989 | Tanigawa | 323/315 |
| 4,825,145 | 4/1989 | Tanaka et al. | 323/315 |
| 5,004,998 | 4/1991 | Horii | 340/507 |
| 5,068,593 | 11/1991 | Wright | 323/315 |
| 5,381,359 | 1/1995 | Abbott et al. | 364/724 |

OTHER PUBLICATIONS

Widlar, R.J., *New Development in IC Voltage Regulators*, IEEE J. Solid-State Circuits, SC-6, 2-7 (Feb. 1971).

Wilson, James S., *An Improved Method of Temperature Compensation of Crystal Oscillators*, Proceedings of the 37th Annual Frequency Control Symposium, 442-7 (1983).

Frerking, Marvin E., *Crystal Ocsillator Design and Temperature Compensation*, Van Nostsrand Reinhold Co., New York, NY (1978).

Sedra et al., "Microelectronic Circuits," CBS College Publishing, pp. 400–404.

*Primary Examiner*—Toan Tran
*Attorney, Agent, or Firm*—Workman Nydegger Seeley

[57] ABSTRACT

An electrical circuit for generating a polynomial function in response to a linear input signal is disclosed. The circuit in one embodiment comprises a primary and a secondary current mirror, with the collector or source of the secondary current mirror connected in common with the input signal of the primary current mirror. The output signal of the electrical circuit is taken at the mirrored current source terminal of the first current mirror. The primary and secondary current mirrors are biased to at least initially respond exponentially to the linear input signal. Each then transitions into the more linear, resistor-dominated range. The primary current mirror is enabled at a predetermined cut-in level, such that an upward curving exponential response function is generated in response thereto. The second current mirror being conducting at a later level of the input signal, but increases more quickly than the primary current mirror so as to gradually deplete the primary current mirror and cause the output signal to transition into a downward sloping exponential function at a predetermined transition point and at a predetermined peak signal amplitude. The output signal then gradually declines to a predetermined cut-out level, where it reaches zero. The circuit can be constructed using BJT or MOS devices and a single transistor can be used in place of the second current mirror. Tuning can be achieved with fusible link tuning resistors and with multiple emitter transistors, as well as with multiple output devices on the primary current mirror, which are digitally controlled for selecting the peak output signal level during operation.

63 Claims, 5 Drawing Sheets

POLYNOMIAL FUNCTION GENERATION CIRCUIT

BACKGROUND OF THE INVENTION

1. Field of the Invention

The present invention relates to the use of electrical circuits for producing a curved polynomial output signal as a function of a linear input signal. More particularly, the present invention relates to an electrical circuit which produces an output signal which is a function of a linear input signal and which has the response characteristics of a well-behaved, bounded parabola.

2. The Relevant Technology

Applications currently exist in the electronics field for an analog circuit which, in response to a linear input signal, generates an output function with particular characteristics, most notably the capacity to approximate a nonlinear wave form. For instance, it sometimes becomes necessary to create a response function which varies as a combination of discrete nonlinear curved sections. Examples of applications of such circuits include circuits for the compensation of precision voltage references, timing delay generators, and precision frequency oscillators, all of which have outputs that can change with environmental conditions, but which can be compensated by the generation of cancelling signals dependent upon the same environmental factors that cause the undesirable output drift.

One approach to these applications is the operational function generator circuit described in a copending United States Patent application Ser. No. 08/314,520, filed Sep. 29, 1994 to Donald T. Comer. In that application, a number of analog circuits are arranged, each with bounded polynomial outputs that may be generated therein, controlled, and summed together in order to approximate a particular continuous correction signal. Thus, the application provides conditioning or generation of signals having an arbitrarily defined shape by an operational function generator. This is achieved through a plurality of bounded polynomial function generators having outputs all of which are summed into a summing network to produce a signal which is a composite of the effects of each of the polynomials.

This application and others like it require that the output function of the discrete polynomial function generation circuits be well-behaved. That is, the polynomial output functions are preferably in the form of a smoothly curving parabolic wave form that can be mathematically characterized by a power series or high order polynomial. It is also required that the output functions of the polynomial function generation circuits have determinable levels below which and above which they are not responsive. These well be hereinafter referred to as the "cut-in level" and the "cut-out level," respectively. Other parameters, such as peak amplitude and the input current level corresponding to the peak amplitude, must also be selectable.

Such a response has proven difficult to approximate, especially with analog circuits. Past attempts have been complex or dependant upon physical effects such as temperature changes. To date, no satisfactory circuit for producing a bounded parabola having such tunable parameters and constructed with an analog circuit exists.

A circuit meeting the above requirements could conceivably be implemented using digital technology such as a microprocessor and an analog to digital convertor. Such a solution would be extremely cumbersome and expensive, however, making it impractical for certain applications.

Also, such a circuit is not currently available which can be satisfactorily employed as an analog integrated circuit or as a mixed signal integrated circuit. This is a major shortcoming in the art, as analog integrated circuits and mixed signal circuits are widely used and are easy to design and produce using application specific integrated circuit technology.

Attempts have been made in the past to create analog circuitry for generating a non-linear polynomial wave form. For instance, U.S. Pat. No. 4,560,959 to Rokos et al. teaches a configuration utilizing a multiplier circuit to generate a particularly shaped polynomial curve for the compensation of crystal oscillators. This and other such circuits are inadequate, however, for the applications described above, because they are extremely complex and require specialized transistor fabrication processes. Tuning these circuits for certain applications would also prove to be difficult.

Thus, the need exists in the art for an analog integrated circuit which generates in response to a linear input signal an output signal, which takes the form of a bounded and well-behaved parabolic function. Such a circuit is also needed that can provide specific tunable parameters such as cut-in voltage, cut-out voltage, median point, and peak amplitude, and that can be implemented in analog integrated circuit or mixed signal form.

SUMMARY AND OBJECTS OF THE INVENTION

The present invention seeks to resolve the above and other problems which have been experienced in the art. More particularly, the present invention constitutes an advancement in the art by providing a circuit for generating a polynomial function in response to a linear input signal which achieves each of the objects listed below.

It is an object of the present invention to provide a circuit for generating an output signal in response to a linear input signal which has the characteristics of a polynomial function, and in particular has the shape of a well-behaved, bounded parabola.

It is likewise an object of the present invention to provide such a circuit which is suitable for inclusion with other such circuits which can then be summed together to form a shaped composite signal of varying plotted curvature, or that can be used independently.

It is accordingly an object of the present invention to provide such a circuit useable to form a composite signal, which is tunable to have selectable cut-in, cut-out, median point, and peak signal levels.

It is further an object of the present invention to provide such a circuit in which either bipolar junction transistors or MOS transistors can be used in the formation thereof.

It is yet another object of the present invention to provide such a circuit wherein fusible link or other resistance adjustment methods can be used to tone certain parameters of the bounded parabolic response function and, in particular, the maximum signal level.

It is still another object of the present invention to provide such a circuit which can utilize multiple emitter or multiple source transistor devices to tune the bounded parabolic response function.

It is also an object of the present invention to generate such a response function which can be implemented with the use of an analog integrated circuit process or a mixed signal integrated circuit process.

It is further an object of the present invention to provide such a circuit wherein thermal matching between the various transistors used in the circuit is achieved by forming the circuit on a common silicon substrate, thereby adding stability to the circuit.

It is still another object of the present invention to provide such a circuit wherein the maximum output signal can be adjusted in binary increments by digital switching.

To achieve the foregoing objects and in accordance with the invention as embodied and broadly described herein in the preferred embodiment, an electrical circuit is provided that has an input node for receiving a linear input signal as well as a means responsive to the linear input signal for generating an output signal which has a graphically curved response function. Preferably, the output signal response function is a polynomial function, and even more preferably, has the form of a well-behaved bounded parabolic function responsive to a predetermined range of the linear input signal. In one embodiment, the output signal generating means comprises an electrical circuit utilizing a current reflecting means in the form of a primary current mirror for generating an output signal, and also comprises a means for diverting current from the current mirror and, thus, from the output signal. The primary current mirror preferably comprises a control transistor and an output transistor. The current diverting means can comprise a single transistor, or can be a second current mirror.

Due to the nature of the current mirror, the current at the current source terminal of the control transistor in the primary current mirror is reflected to the current source terminal of the output transistor at the primary current mirror. The output signal is taken as a sink current from the current source terminal of the output transistor.

Understanding that the polynomial function generation circuit of the present invention can be implemented using both bipolar junction "BJT" and metal oxide semiconductor "MOS" transistors, the circuit will be explained for BJT transistors using BJT terminology. One skilled in the art will understand the corresponding configuration and terminology when using MOS devices.

In accordance with one embodiment of the present invention, the current diverting means comprises a secondary current mirror, though a single transistor substituted in place of the secondary current mirror has been found to respond with similar results. The primary and secondary current mirrors are arranged such that the secondary current mirror "robs" or diverts current from the current source terminal of the control device of the primary current mirror, in order to result in the particular, rounded curvature of the output signal response function. The current source terminal corresponds to what is known as "collector terminal" in BJT terminology.

The collector terminal of the control transistor of the primary and secondary current mirrors are each connected in common to the linear input signal. The output signal is taken at the collector terminal node of the output transistor of the primary current mirror. The collector terminal node of the control transistor of the primary current mirror, after passing through an input resistor, is also connected in common with the control terminal, which in BJT terminology is the base terminal, of the both the control transistor and the output transistor of the primary current mirror. Also connected in common with this node is the collector terminal of the output transistor of the secondary current mirror.

The transistors of the primary and secondary current mirrors initially operate in an early portion of their output ranges wherein the transistor device characteristics dominate and the device output response function rises exponentially in response to a linear input function. The current mirrors are then biased to transition into a more linear, resistor-dominated upper range. This operation in the exponential range and subsequent transition into the linear region also helps create the rounded curvature of the response function output signal.

The primary current mirror is biased to have a range of operation over the linear input signal which begins at the cut-in level of the input signal. Previous to the cut-in level, the output signal will be zero, and starting at the cut-in level, it will form an upwardly curving exponential function. The secondary current mirror is biased to initially begin conducting at a slightly higher voltage than the primary current mirror. As the secondary current mirror begins to operate, the input current through the output transistor of the secondary current mirror increasingly diverts current from the control transistor of the primary current mirror. Thus, the collector currents of the primary current mirror are gradually reduced, and the output signal begins to taper off. At a predetermined median point, the output signal will reach its maximum level. Thereafter, the secondary current mirror will begin to dominate. At some point, all current coming from the input signal will be diverted through the secondary current mirror, and the range of operation of the primary current mirror will end at the cut-out level. The secondary current mirror will continue to conduct current as long as the input signal increases, but will have no effect on the output signal, which will remain at zero. Consequently, the output signal function will transition into a downward sloping exponential shape until the end of the range of operation is reached, at which point the output signal will be zero.

The primary current mirror will initially operate in the device-characteristics-controlled exponential range, but will transition into the more linear, resistor biased range. The output response function stays rounded however, because the secondary current mirror, which begins conducting current somewhat later, also operates initially in the exponential range. The secondary current mirror is biased to increase its current conduction faster than the primary current mirror, and is aided in doing so by the dropping voltage at the control terminals of the primary current mirror transistors as the current therethrough decreases, which causes the current conducted in the transistors of the primary current mirror to drop, while the current conducted in the secondary current mirror correspondingly increases.

Also provided in the present invention is means for tuning certain selected parameters in order to vary characteristics of the output signal response function. For instance, scaling of the first and second current mirror emitter areas can be used to select the peak current amplitude, as well as the curvature of the parabolic response function. Resistors located on the input terminals of the control transistors of the primary and secondary current mirrors can be used to set the cut-in levels of the primary and secondary current mirrors. From this, the cut-in level of the entire circuit can be determined, as well as the cut-out level and median point. Resistors connected between a common ground and the output current terminals, referred to as the emitter terminal in BJT terminology, of each of the transistors provide emitter degeneration, which correspondingly determines when each transistor transitions from the exponential device-characteristics-controlled region to the more linear, resistor-dominated region. This, in turn, is also used to trim certain of the parameters of the bounded parabolic response function, such as the peak current amplitude, median point, and roundness of the curvature.

The polynomial function generation circuit of the present invention has been found to work well with BJT and with MOS transistors, though other transistors could also conceivably be used and would be within the scope of the present invention. The polynomial function generation circuit of the present invention is preferably implemented in an analog integrated circuit or a mixed signal integrated circuit and formed on a common silicon substrate. This will result in close thermal matching between the transistors and a more controllable output function. The resistors used in the circuit can be implemented as diffused resistors, and can be placed in an independent isolation pocket in the integrated circuit for thermal matching purposes.

The tuning resistors can be implemented as fusible link trimming resistors. This allows for tuning of the above-mentioned parameters after the chip has been fabricated. The emitter areas of the transistors may be scaled with the use of multiple emitter transistor devices. The multiple emitter transistor devices may also be selectable by fusible link resistors. Furthermore, the primary current mirror can be configured as a multiple output current mirror with the multiple output transistors being controlled by switching transistors located across their current output terminal nodes. This allows for digital control in binary increments by a logic chip for curve firing of the peak current amplitude during operation.

The circuit will be highly useful in any situation where a parabolic response function is desired, and is particularly useful in circuits as described above, wherein a series of such bounded function generating circuits are summed together to form a composite response function to a linear input signal such as when compensating for temperature variations in precise circuits and devices.

Thus, a circuit is provided which generates a well-behaved and selectable parabolic response function to a linear input signal, and which has predetermined tunable parameters such as the cut-in level, cut-out level median point, and maximum signal amplitude. As a result, it is suitable as a stand alone wave form approximation function generation circuit or for inclusion in a summing circuit which forms a composite wave form.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be illustrated, a more particular description of the invention, briefly described above, will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention comprises an analog polynomial function generation circuit that is particularly well suited for use as one of a series of inputs to a summing circuit for approximating a specific response to a linear input. It should be apparent, however, that the present invention provides a novel circuit for forming a well-behaved parabolic response to a linear input and, as such, will have other uses which are also considered to fall within the scope of the present invention.

Figure 1:
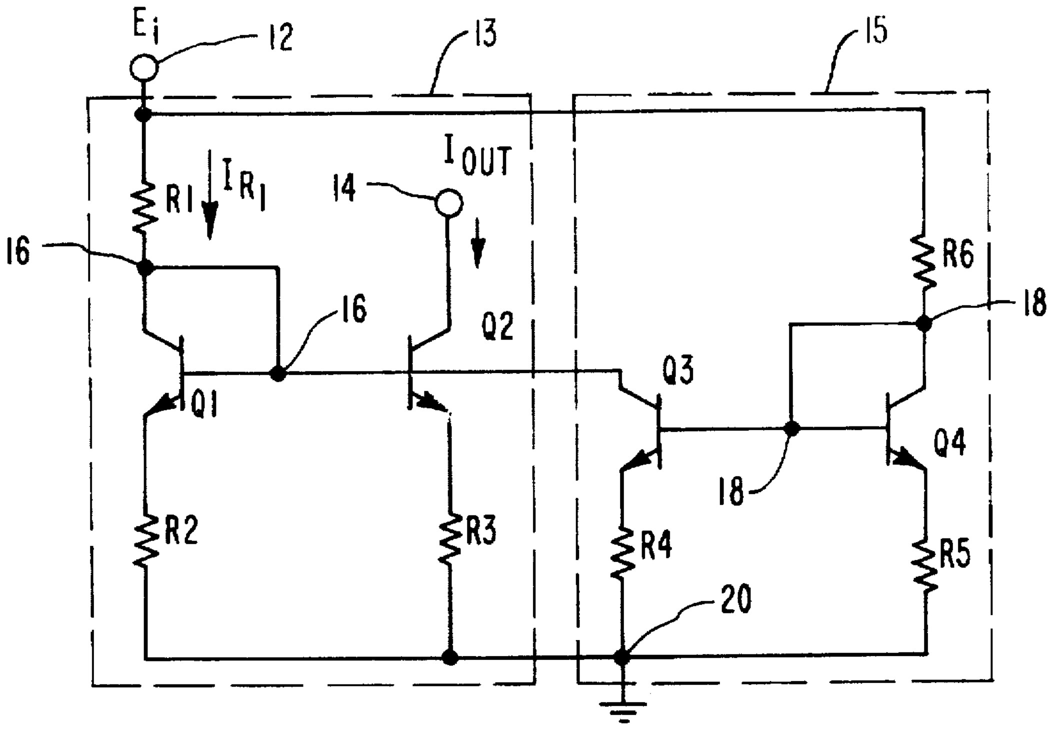
FIG. 1 is a schematic representation of one embodiment of the polynomial function generation circuit of the present invention utilizing bipolar junction transistors and employing a primary and secondary current mirror.

The polynomial function generation circuit of the present invention is shown in one embodiment in FIG. 1. Therein it can be seen that the polynomial function generation circuit is provided with an input terminal 12 for receiving an input signal $E_i$. Input signal $E_i$ is preferably a linear function, and most preferably comprises a voltage, as is depicted graphically in FIG. 2. The linear input signal of FIG. 2 is generated in the illustrated example by a temperature sensor and can be described mathematically as $$E_i = V_O + KT,$$

where $E_i$ is the input signal to the polynomial function generation circuit, $V_O$ is an offset voltage, K is a scaler constant, and T is a variable, representing a changing temperature. As a result of the configuration of the function generation circuit depicted in FIG. 1 thereof, an output signal, designated as $I_{out}$ and having the characteristics of a sink output is generated. Output signal $I_{out}$ is preferably a current signal, but could also be generated as a voltage signal. When generated as a current signal, a voltage signal can be easily generated therefrom using generally known methods, such as those involving the use of an operational amplifier.

Figure 2:
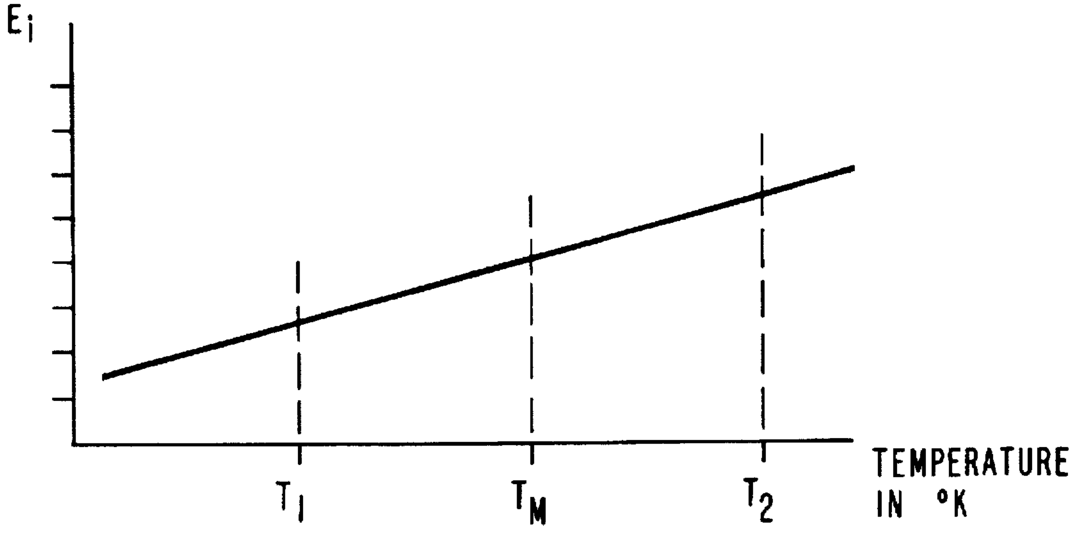
FIG. 2 is a graphical representation of a linear input signal such as is intended for use with the function generation circuit of the present invention.
Figure 3:
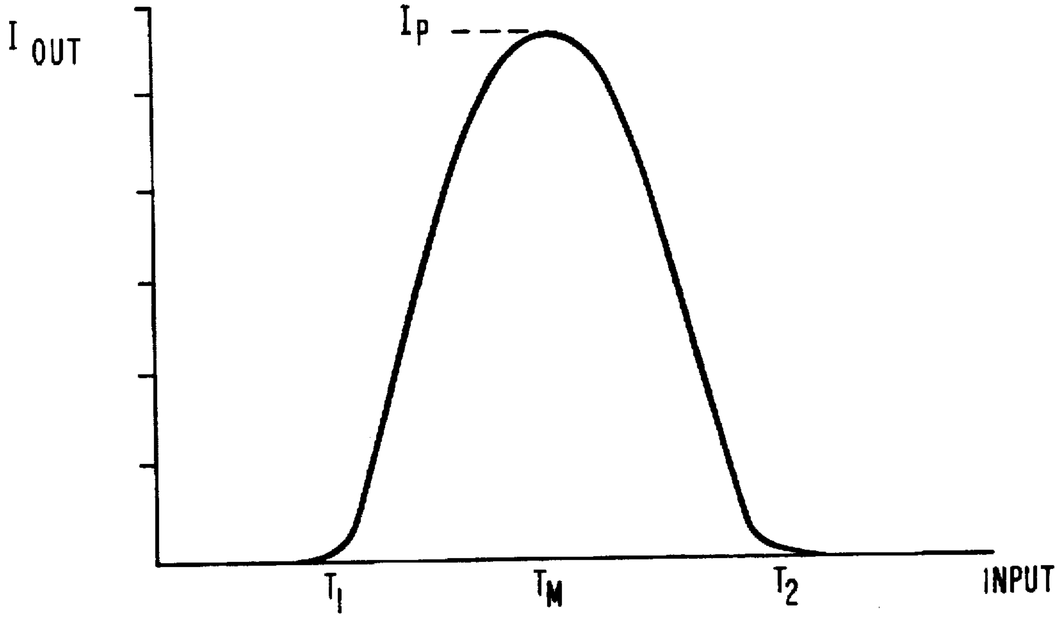
FIG. 3 is a graphical representation of an intended output response function of the present invention generated in response to the input signal of FIG. 2.

Output signal $I_{out}$ has a response function to the linear input signal of FIG. 2, a representative example of which is depicted graphically in FIG. 3. Provided therein is a well-behaved, relatively constantly varying parabolic response signal having a cut-in value $T_1$, a cut-out value $T_2$, and a peak current amplitude $I_P$, occurring at a median point $T_m$. The term "well-behaved" as used herein is intended to mean that the output signal is graphically curved in a symmetrical and relatively constant manner.

The circuit of FIG. 1 has two functional components. One functional component is a primary current mirror 13, which is made up of a control transistor Q1 and an output transistor Q2, and the other is a secondary current mirror 15 utilizing a second control transistor Q4 and a second output transistor Q3. The configuration of primary current mirror 13 will result in a current $I_{C2}$ at the collector of transistor Q2, which mirrors the collector current $I_{C1}$ of transistor Q1. Output signal $I_{out}$ appears at output terminal 14, which is connected in a common node with the collector terminal of transistor Q2. Secondary current mirror 15 is connected with primary current mirror 13 in such a way as to divert current from primary current mirror 13, thus forming a "robber circuit." Consequently, transistors Q3 and Q4 divert the collector current $I_{C1}$ of transistor Q1, and correspondingly reduce the collector current $I_{C2}$ of transistor Q2, which determines the reflected output current $I_{out}$.

The collector current $I_{C2}$ of transistor Q2 will correspond to a scaled multiple of the collector current $I_{C1}$ of transistor Q1. This is because their base terminals are linked by a common voltage at primary base node 16. This voltage corresponds to input signal $E_i$, after input signal $E_i$ has been divided between voltage drops at resistor $R_1$ and resistor $R_2$ and further by resistor $R_4$, if transistor Q3 is conducting current. The emitter areas of transistors $Q_1$ and $Q_2$ can be scaled by a value of N, such that the reflected current $I_{c2}$ will be a multiple of $I_{c1}$. Thus, neglecting the effects of biasing resistors, the current at output terminal 14 can be generally expressed by the equation:

$$I_{out}=I_{C2}=N(I_{R1}-I_{C3}),$$

where N is the scaling factor, resulting from the respective emitter areas of transistor Q1 and transistor Q2, $I_{R1}$ is the current through resistor $R_{R1}$, $I_{C2}$ is the current through the collector of transistor Q2 and $I_{C3}$ is the current through the collector terminal of transistor Q3.

When operated at low voltages, both of primary current mirror 13 and secondary current mirror 15 will operate in an initial portion of their output range that increases exponentially. That is, they will have an output function that varies exponentially in response to a linear input signal, as designated in the following equation, which is generally referred to as the "diode equation."

$$I_c=I_{eo}e^{Vbe/Vt}$$

In the diode equation, $I_C$ represents the collector current through each of transistors $Q_1$–$Q_4$, respectively, and $I_{eo}$ is a constant saturation current. The variable $V_{BE}$ is the base to emitter voltage, and $V_t$ is determined by physical constants and is a constant voltage at a given temperature. At higher $V_{BE}$ levels, the resistor biasing will take over and tend to dominate this equation, elevating it to a more linear range, where it will begin to behave more like the following equation, given for $I_{C1}$:

$$I_{C1}=(E_i-V_{BE1}\backslash R_1),$$

where $V_{BE1}$ is relatively constant and R1 is the resistor on the collector terminal of transistor Q1, and where $I_{out}=I_{C2}=N(I_{C1})$. Thus, the operation of primary and secondary current mirrors 13 and 15 in the exponential range, as well as the reduction of the output signal $I_{out}$ by the secondary current mirror combine to form the parabolic output signal response function of FIG. 3.

In order to form the rounded shape and other parameters of the output signal response function of FIG. 3, the present invention also provides a means for tuning the polynomial function generation circuit by varying certain parameters, such as the values of the resistors and the relative transistor emitter areas. For instance, by scaling the relative emitter areas of transistors Q1 and Q2, peak current value $I_P$ can be adjusted. Also, scaling the emitter areas of transistors Q4 and Q3 will help determine the median point $T_m$, peak current amplitude $I_P$, and cut-out time $T_2$. Varying the ratio of the values of resistors R6 and R1 will determine when secondary current mirror 15 begins to divert current from the primary control transistor collector current $I_{C1}$, and correspondingly from $I_{C2}$ and $I_{out}$. Resistors R2 through R5 may be used as trimming resistors, which are further used to determine the cut-in and cut-out levels, as well as the shape of the response signal.

In a more specific description of the circuit of FIG. 1, provided therein is primary current mirror control transistor Q1 connected in common at primary base node 16 to primary current mirror output transistor Q2. All transistors in the embodiment of FIG. 1 are bipolar junction NPN transistors. Input terminal 12 is connected through a resistor R1 to the collector terminal of transistor Q1. The node between resistor R1 and the collector terminal of transistor Q1 is connected in common at base node 16 with the base terminals of transistors Q1 and Q2. The emitter terminal of transistor Q1 is connected to a common ground node 20 through resistor R2. The collector terminal of transistor Q2 is connected to output terminal 14, from which the output signal $I_{out}$ is taken. The emitter terminal of transistor Q2 is connected to common ground node 20 through resistor R3. Also connected to primary base node 16 is the collector of transistor Q3. The emitter terminal of transistor Q3 is connected through resistor R4 to common ground node 20. Input terminal 12 is connected to the base terminal of transistor Q3 through resistor R6. Connected in a common secondary current mirror base node 18 with the base terminal of transistor Q3 is the base terminal of transistor Q4. The collector terminal of transistor Q4 is also connected to secondary base node 22, and the emitter terminal of transistor Q4 is connected through resistor R5 to common ground node 24.

In order to provide close thermal matching between transistors Q1, Q2, Q3, and Q4, the circuit of FIG. 1 is preferably formed as an integrated circuit on a single silicon substrate. This allows for close thermal tracking among the transistors and provides for a predictable and reliable output function such as that of FIG. 3. The resistors used to form the function generation circuit can be diffused resistors, and can be placed in an independent isolation pocket for thermal tracking purposes.

In operation of the polynomial function generation circuit of FIG. 1, linear input signal $E_i$ of FIG. 2 is applied to input terminal 12. At a predetermined cut-in level, designated as $T_1$ on FIGS. 2 and 3, input signal $E_i$ will reach a voltage level $V_{BE}$ at the common node between the base of transistor Q1 and the base of transistor Q2, which will be sufficient to cause conduction of transistors Q1 and Q2. This will cause transistor Q1 to begin conducting collector current $I_{C1}$. Using the proper biasing, as input signal $E_i$ increases, this current flow will increase exponentially in accordance with the aforementioned diode equation. At a predetermined point between cut-in level $T_1$ on FIG. 3 and median point $T_m$, the voltage at secondary base node 18 will become sufficient to cause conduction of transistors $Q_3$ and $Q_4$. Current $I_{c4}$ will begin flowing through transistor Q4 and resistor R5. Concurrently, a mirrored current $I_{c3}$ will begin flowing through transistor Q3 and resistor R4. This current is diverted from current $I_{C1}$ at the collector of transistor Q1, thereby reducing output signal $I_{our}$.

As shown above, output signal $I_{out}$ is related to collector current $I_{C1}$ of transistor Q1 by the equation:

$$I_{out}=I_{C2}=N(I_{C1}),\ \text{where}\ I_{C1}=(I_{R1}-I_{C3}).$$

The gain scaler N is determined by the emitter scaling of transistor Q2, as compared to transistor Q1, as also discussed above. Thus, gain scaler N will determine the level of the peak current amplitude $I_P$. As the voltage on the base terminal of transistor Q3 increases, it will in turn lower current $I_{C1}$ and correspondingly, the voltage on the base terminal of transistor Q1. This will divert greater and greater amounts of current through transistor Q3, thus continuing to lower in an exponential manner the output signal $I_{our}$. Initially, primary current mirror 13 will operate in the exponential range. At some point between cut-in level $T_1$ and median point $T_m$, it will transition to the resistor dominated linear range. Secondary current mirror 15 will initially operate in the exponential range, and will be biased to enter the resistor-dominated, linear range after median point $T_m$. At this time, primary current mirror 13 will have its reference current reduced to the point where it will have regressed back to in the exponential range. This operation in the exponential range, caused by the robber current mirror accounts for the rounded curvature of the output function, as shown in FIG. 3. The concurrent reduction of primary current mirror 13 and increase in conduction of secondary current mirror 15 may also have a multiplier effect which aids in the formation of the curvature of the output response function.

At some point, the current through transistor Q3 will reduce the current $I_{c1}$ through transistor Q1 to the point that current $I_{c1}$ is no longer increasing. This occurs at median point $T_m$ on FIG. 3. Thereafter, current $I_{C3}$ will continue to increase in an exponential manner, further diverting from and depleting current $I_{C1}$, and correspondingly output signal $I_{our}$. Transistor Q3 will eventually conduct sufficient current that it will reduce the voltage on the base terminal of transistor Q1 below the threshold voltage and shut off transistor Q1 altogether. The point at which this occurs is designated on FIG. 3 as the cut-out level T2, and is the point above which currents $I_{C1}$ and $I_{out}$ will both be zero.

Specifically describing the selection of cut-in level $T_1$, cut-out level $T_2$, and peak current amplitude $I_P$, these are selectable by appropriate tuning of specific parameters of the various individual discrete devices as follows. The varying of resistor R1 will result in the determination of the cut-in level $T_1$. Selecting a larger value for resistor R1 will result in a later cut-in level at a higher input signal $E_i$ voltage, while selecting a lesser value will select an earlier cut-in level. Varying resistor R6 will determine the beginning of conduction of current of secondary current mirror 15, which will in turn determine the peak current amplitude $I_P$, as well as the curvature and roundness of the response function at the output signal $I_{our}$. A higher value will result in a higher amplitude, as well as a less rounded parabolic output function, and a lower value will have the opposite effect. Varying R2 in relation to R3 will also result in a scaling of the peak current amplitude $I_P$. Selecting resistor R3 to have a higher value than resistor R2 will result in a lower peak current amplitude $I_P$, while selecting a lower value for resistor R3 compared to resistor R2, will result in a higher peak current amplitude. Varying resistor R5 in relation to resistor R4 is used to fine tune median point $T_m$. Selecting a larger value for resistor R5 in relation to resistor R4 will reduce median point $T_m$, while selecting a larger value for resistor R4 in relation to resistor R5 will advance median point $T_m$.

Furthermore, varying the emitter area scaling of primary current mirror 13 will result in a determination of peak current amplitude $I_P$, as discussed, due to scaling of output signal $I_{out}$ in relation to input signal $E_i$. Varying the emitter area on transistor Q2 to vary as the scaler N compared to transistor Q1, will result in a peak current amplitude $I_P$ in accordance with the equation from above:

$$I_{out}=N(I_{R1}-I_{c2}).$$

Thus, a larger relative emitter area of transistor Q2 corresponds to a larger value of N and correspondingly to a higher peak current amplitude $I_P$. Also, varying the emitter areas of transistors Q3 and Q4 of secondary current mirror 15 will also help to determine the median point $T_m$. These general parameter varying guidelines have proven especially effective for shaping desired polynomial output signal responses when used with computer simulation programs such as P-Spice™.

Figure 4:
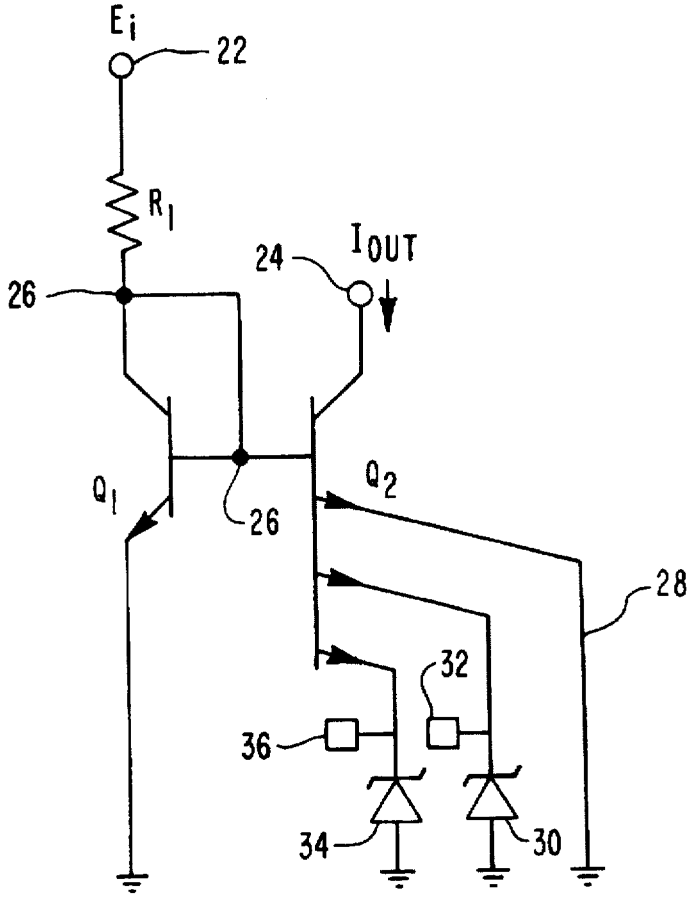
FIG. 4 is a depiction of a current mirror with multiple emitters selectable with fusible link trimming as is contemplated for inclusion in the polynomial function generation circuit of the present invention.

In order to vary the resistor values and select the parameters described above, fusible link trimming resistors, as disclosed in U.S. Pat. No. 4,777,471 to Donald T. Comer, which is hereby incorporated by reference into this document, may be used. An implementation of a fusible link trimming method in a current minor is shown in FIG. 4. The current mirror of FIG. 4 could be substituted for either of the primary or secondary current mirrors 13 and 15 of FIG. 1, wherein one or both of transistors Q2 and Q4 would be supplied with multiple emitters for emitter scaling. This in tun could be used for selecting the parameters described above after the circuit has been fabricated as an integrated circuit.

Figure 5:
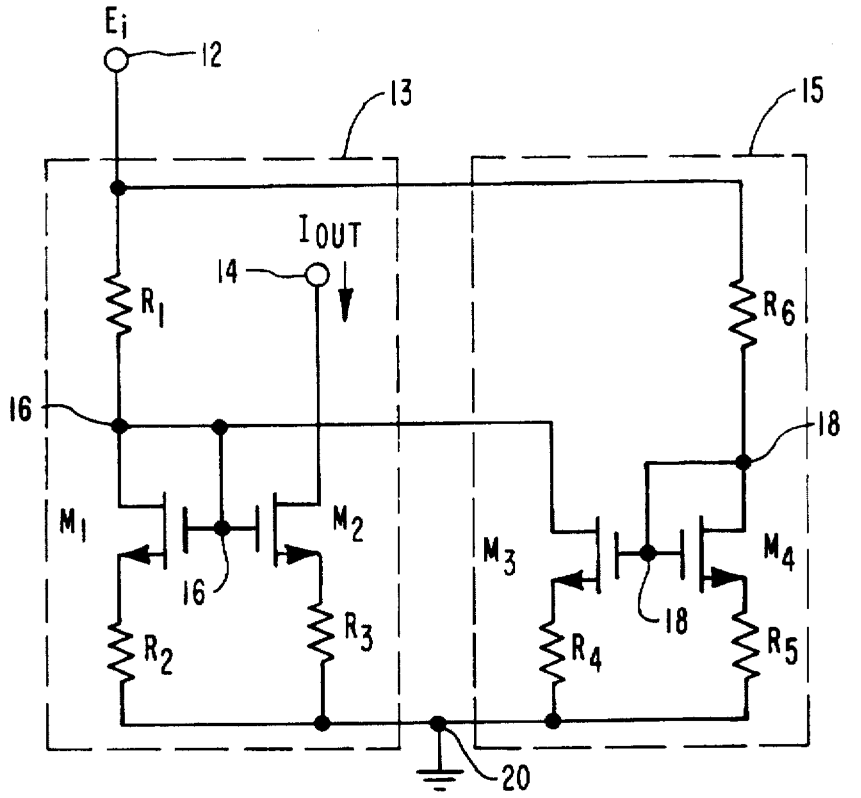
FIG. 5 is a schematic representation of a further embodiment of the polynomial function generation circuit of the present invention having the same configuration as the circuit of FIG. 1, but using MOS technology.
Figure 6:
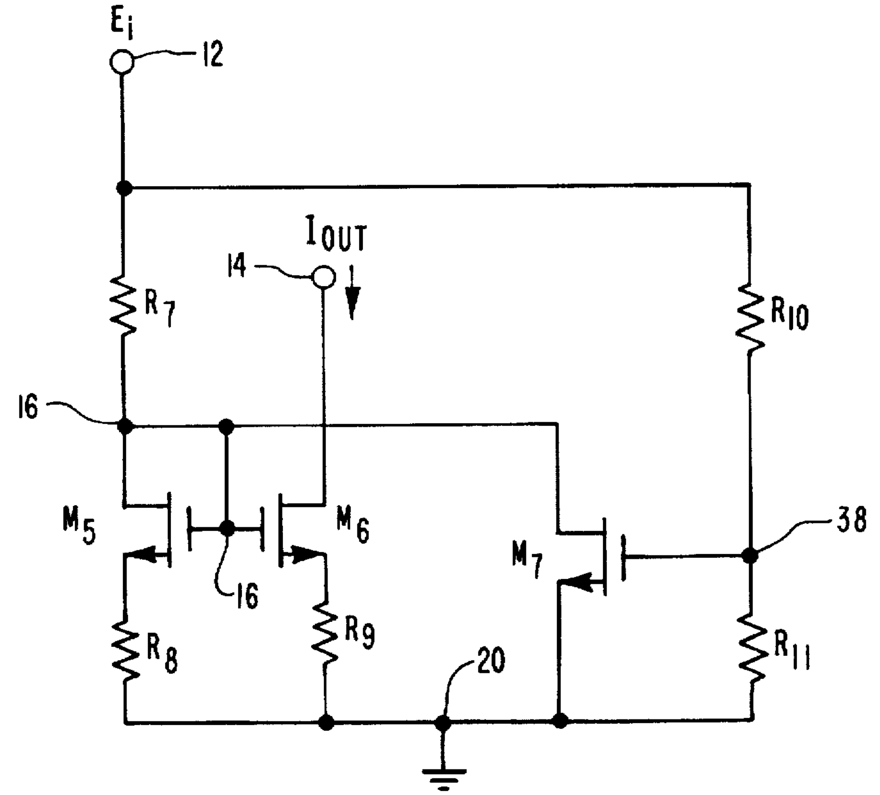
FIG. 6 is a schematic representation of another embodiment of the polynomial function generation circuit, similar to the circuit of FIG. 5, but utilizing a single transistor robber device rather than a second current mirror.
Figure 7:
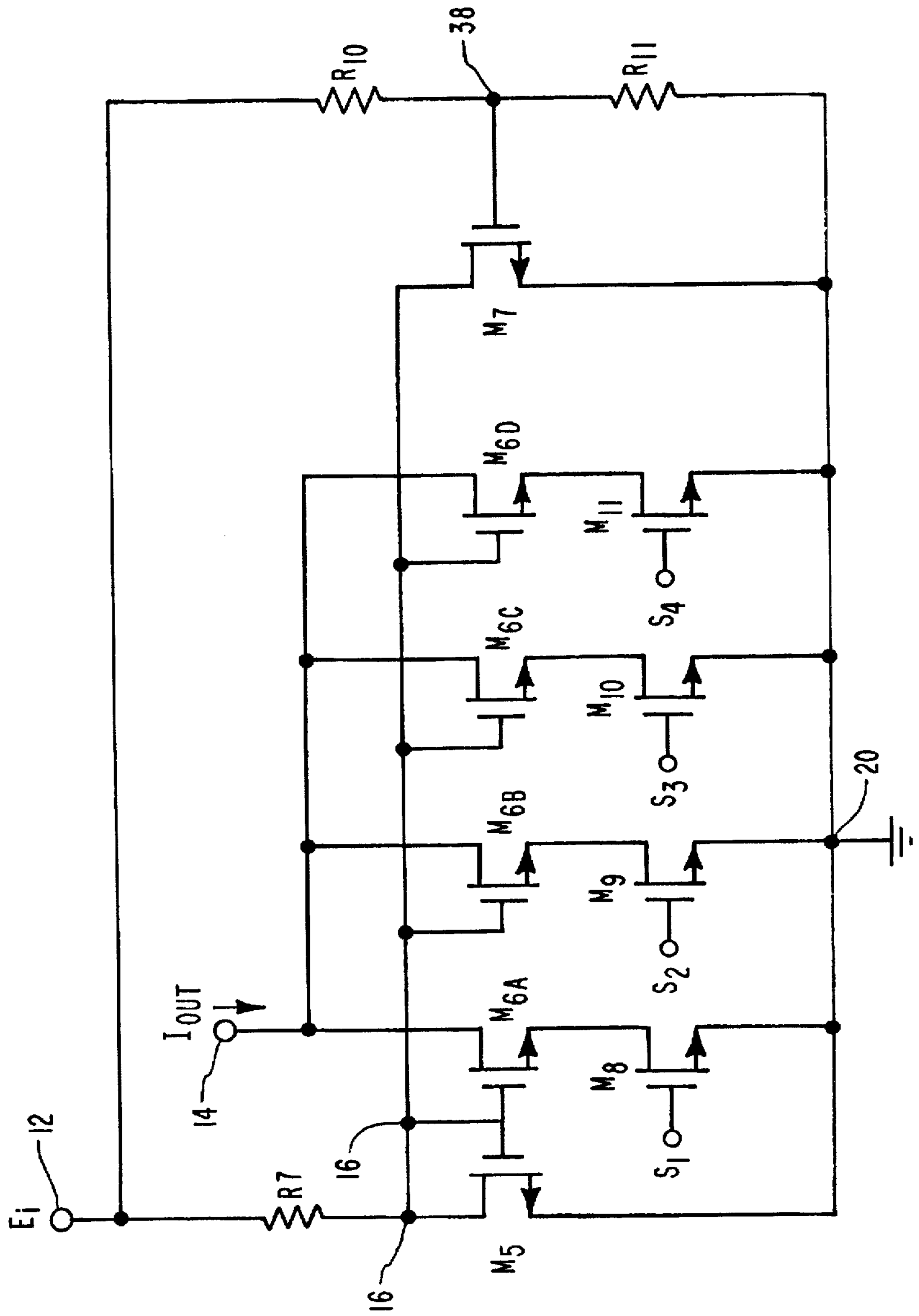
FIG. 7 is a schematic representation of a still further embodiment of the polynomial function generation circuit of the present invention similar to the circuit of FIG. 6, but implemented using multiple output devices in place of the single output transistor of the primary current mirror, each having a switching transistor on its emitter node thereon to enable digital switching of the peak current amplitude.

The polynomial function generation circuit of the present invention can be designed with either bipolar junction (BJT) transistors or with metal oxide semiconductor (MOS) transistors. The embodiments of FIGS. 5 through 7 show a polynomial function generation circuit of the present invention having the input characteristics of FIG. 2 and the output characteristics of FIG. 3, but implemented using N-channel MOS enhancement mode transistors. In FIG. 5, a circuit almost identical in operation to that of FIG. 1 is depicted. The operation of the circuit is almost identical when using enhancement mode MOS technology, with the exception that, rather than being operated in an exponential range, the early portion, or "triode region" of the MOS transistor output range has a square law response, rather than an exponential one. The result has been found to be substantially the same, resulting in the generation era well-behaved parabolic response, such as that of FIG. 3. Also, rather than scaling the emitter areas in an MOS implemented polynomial function generation circuit of the present invention, the channel width would be varied. The manner in which both enhancement and depletion mode MOS transistors could be used to implement the present invention should be evident from the above discussion.

In FIG. 6, a circuit functionally similar to that of FIG. 5, but using only a single transistor as a robber device in place of secondary current mirror 15, is shown. When properly biased, this circuit will also result in a parabolic output such as that of FIG. 3.

In FIG. 7, the circuit of FIG. 6 is implemented using a multiple output device current mirror with multiple output transistors $M_{6A}$ through $M_{6D}$ connected in place of transistor $M_6$ on primary current mirror 13. The configuration is used in order to provide the capability of tuning peak current amplitude $I_P$ during operation. Switching transistors $M_8$ through $M_{11}$ are connected across the emitter terminal nodes of transistors $M_{6A}$ through $M_{6D}$, and can be connected to a digital logic circuit, such as a microprocessor. The microprocessor can then be programmed with a specific response, whereby the amplitude is continually adjusted during operation by turning on and off certain of switching transistors $M_{6A}$ through $M_{6D}$. If each of switchable transistors $M_{6A}$ through $M_{6D}$ are provided with varying channel widths, one can be selected at a time, depending on how much current is needed for peak current amplitude $I_P$, or two or more can be enabled at a time to sum their currents into output signal $I_{out}$ at the output node 14.

Figure 8:
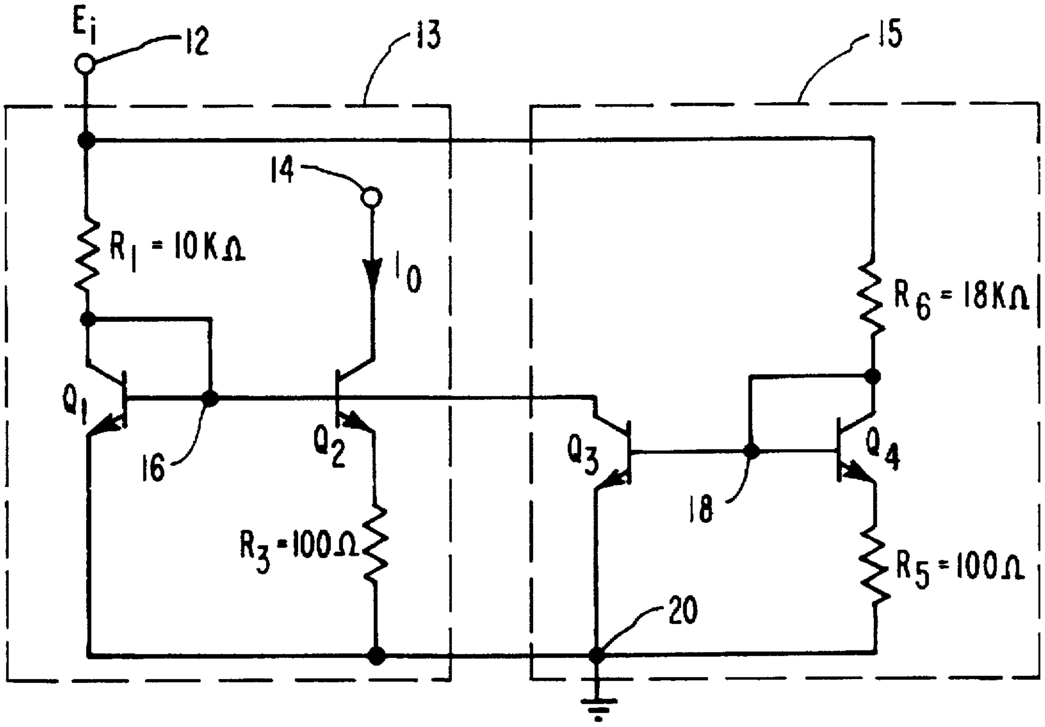
FIG. 8 is a schematic representation of the polynomial function generation circuit of FIG. 1, with specific device values portrayed thereon.

In FIG. 8, the polynomial function generation circuit of FIG. 1 is shown with the addition of corresponding values for the individual resistors. This embodiment is given by way of example, and is not intended to be restrictive, but is to illustrate the results of selecting the parameters in accordance with the above discussion. Shown in FIG. 8 is resistor R1, which has been selected to have a value of 10 KOhms. Resistor R2 has been lo selected to have a value of zero, and is not depicted. Resistor R3 has a selected value of 100 Ohms, and resistor R4 has been selected to have a value of zero, and is also not depicted. Resistor R5 has a selected value of 100 Ohms, and Resistor R6 has a selected value of 18 KOhms.

In order to minimize space on the integrated circuit, transistors Q1, Q3, and Q4 have each been selected with corresponding minimum sized emitter areas. The scaler N equals forty, and the amplitude has been set using the values of resistors R3 and R5 along with the scaler N.

Figure 9:
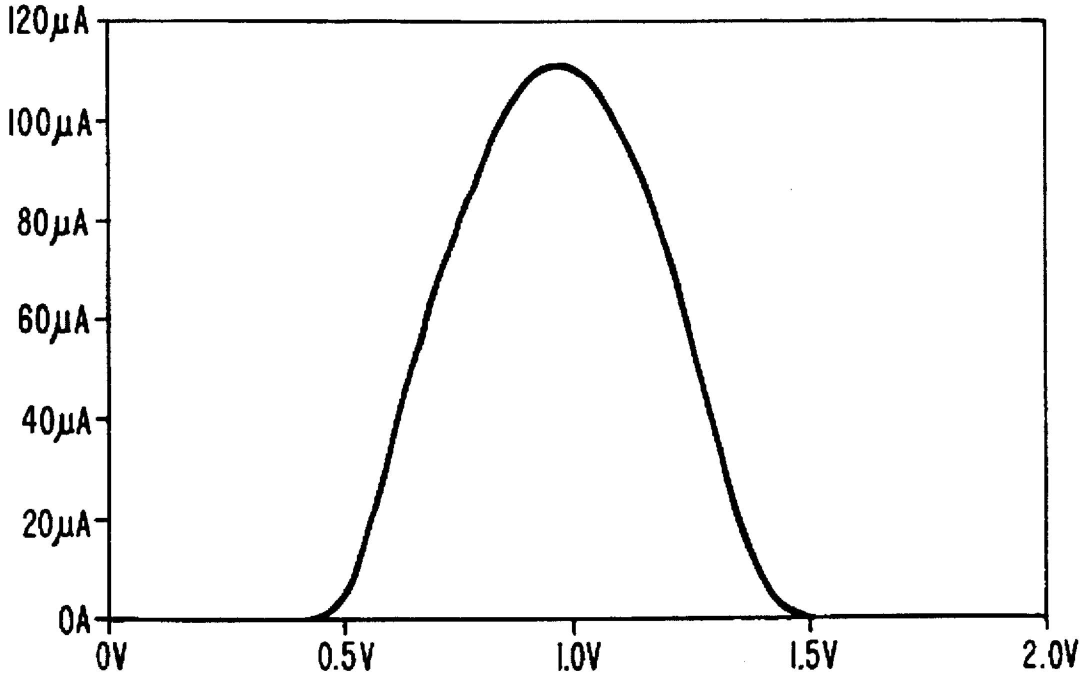
FIG. 9 is a schematic representation of the output response function of the circuit of FIG. 8 when provided with a linear input signal such as that of FIG. 2.

FIG. 9 shows the resulting output signal response function of the circuit of FIG. 8 when supplied with the input signal of FIG. 1, and is a graphical depiction of a P-Spice™ computer simulation of the operation of the circuit of FIG. 8. Therein can be seen a resulting cut-in level of about 0.5 volts and a cut-out level of about 1.5 volts. The peak current amplitude $I_P$ is about 110 microamperes, and occurs at a median point $T_m$ of about 1 volt. Thus, the output response function is a bounded and well-behaved parabolic function. The parameters of the polynomial function generation circuit of FIG. 8 can be adjusted by one skilled in the art in accordance with the above discussion with a minimum of experimentation.

The polynomial function generation circuit of the present invention may be used alone, where such a well-behaved parabolic response is desired in an analog integrated circuit to a linear input signal. For example, the embodiment of FIG. 6 has been found to closely approximate a temperature compensation function when provided with the proper parameters. The present invention can also be used as one of a series of function approximation signals, which are summed by a summing circuit over their varying ranges to approximate an output response, which is a combination of curved and linear segments, as discussed in the Background of the Invention section above.

From the above discussion, it can be seen that the present invention provides an analog integrated circuit for generating a well-behaved parabolic signal in response to a linear input signal. The polynomial function generation circuit of the present invention provides a well-behaved graphically curved output response function respondent to a linear input signal, having selectable cut-in and cut-out levels $T_1$ and $T_2$, as well as a selectable median value $T_m$ with a corresponding peak current amplitude $I_P$. Furthermore, the invention utilizes the temperature matching characteristics of a common substrate integrated circuit. It also provides a simple design for approximating such a signal independently or as one component of a series of other polynomial function generating signals to be used to approximate a larger response. When used in such a summing circuit, it forms a suitable temperature compensation circuit.

The present invention may be embodied in other specific forms without departing from its spirit or essential characteristics. The described embodiments are to be considered in all respects only as illustrated and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An electrical circuit for approximating a polynomial function, the circuit comprising:

a. a signal receiving node for receiving a linear input signal having a predetermined range;

b. primary circuit means for generating an output electrical signal, and secondary circuit means, operatively connected to said primary circuit means, for diverting a portion of the output signal, and each of the primary and secondary circuit means comprising:

i. transistor means, in electrical communication with the signal receiving node, for providing one operational range thereof that varies non-linearly in response to the linear input signal, and for providing a second operational range thereof that varies linearly in response to the linear input signal; and ii. an output node for each transistor means, said output nodes of the respective transistor means being commonly connected so that the operation of the primary and secondary circuit means together combine to form the graphically curved output response function.

2. An electrical circuit as recited in claim 1 further comprising;

a. means for establishing a lower limit of the linear input signal below which the output response function is not responsive;

b. means for establishing an upper limit of the linear input signal above which the output response function is not responsive; and c. means for establishing a peak amplitude of the output response function that is attained in response to a predetermined level of the input signal.

3. An electrical circuit as recited in claim 1, further comprising means for selectively varying the curvature of the output signal.

4. An electrical circuit as recited in claim 1, wherein the transistor means of the primary circuit means comprises current reflecting means in electrical communication with the signal receiving node for generating a first electrical signal in response to the linear input signal, said current reflecting means comprising at least one transistor, the graphically curved output response function corresponding to a scaled multiple of the first electrical signal.

5. All electrical circuit as recited in claim 1, wherein the transistor means of each sad circuit means comprises a plurality of discrete devices for biasing each said transistor means to obtain desired operating characteristics, and wherein the curvature of the output signal is selectable by varying the characteristics of the discrete devices.

6. An electrical circuit as recited in claim 1 wherein the curved output response function comprises a well-behaved bounded parabolic function.

7. An electrical circuit as recited in claim 4 wherein the current reflecting means comprises a current mirror, the current mirror comprising a further transistor with the first signal appearing on a current source terminal of the at least one transistor trod with the output response function appearing on a current source terminal of the other transistor.

8. An electrical circuit as recited in claim 7, further comprising a control terminal on each of the transistors, the control terminals of the transistors being connected in a common node with the current source terminal on which the first signal appears and being provided with the linear input signal at the common node.

9. An electrical circuit as recited in claim 7, wherein the transistor means of the secondary circuit means comprises a third transistor, a current source of the third transistor having a common connection with the current source terminal of the first transistor, thereby diverting current from the first transistor, such that the output response function is gradually depicted.

10. An electrical circuit as recited in claim 9, wherein the transistor means of the secondary circuit means comprises a second current mirror, the second current mirror comprising the third transistor and a fourth transistor.

11. An electrical circuit recited in claim 10, further comprising a control terminal on each of the third and fourth transistors, the control terminal of the third and fourth transistor being connected in a common node with a current source terminal of the fourth transistor and being provided with the input signal at the common node with the current source terminal of the fourth transistor.

12. An electrical circuit as recited in claim 1, further comprising means for selecting a level of the input signal at which the transistor means of the primary circuit means transitions between the non-linear range and the linear range, thereby substantially affecting the curved output response function.

13. An electrical circuit as recited in claim 10, further comprising a resistor connected to a current source terminal of the fourth transistor for, determining a level of the input signal at which the secondary current mirror begins to conduct current, in order to determine a peak output of the curved output response function as well as to affect the curvature of the output response function.

14. An electrical circuit as recited in claim 7, further comprising a resistor connected to the current source terminal of the at least one transistor, and wherein varying the value of the resistor determines the level of the input signal at which the output response function begins to have a positive value.

15. An electrical circuit as recited in claim 1, further comprising means, electrically connected to at least one of said primary or secondary circuit means, for determining the median point of the output response function.

16. An electrical circuit as recited in claim 12, wherein the means for selecting comprises at least one transistor and a resistor connected to a current output terminal of the at least one transistor, and wherein increasing the value of the resistor increases the amplitude and flattens the curvature of the output response function.

17. An electrical circuit as recited in claim 7, wherein the amplitude of the curved output response function is determined by the relative size of the emitter areas of the transistors.

18. An electrical circuit as recited in claim 1, wherein the transistor means is comprised of bipolar junction transistors.

19. An electrical circuit as recited in claim 1, wherein the transistor means is comprised of MOS transistors.

20. An electrical circuit as recited in claim 5, wherein at least a portion of the discrete devices comprise fusible link trimming resistors.

21. An electrical circuit as recited in claim 17, wherein at least one of the transistors is a multiple emitter transistor, the multiple emitters having varying electrical characteristics, and wherein the amplitude of the output response function can be varied by selectively enabling the emitters of the multiple emitter transistor.

22. An electrical circuit as recited in claim 7, further comprising the use of a third transistor in the current mirror, the third transistor having a current source terminal connected in series with the further transistor, the third transistor being enabled or disabled during operation of the electrical circuit such that a peak amplitude of the output response function can be selected during the operation of the electrical circuit.

23. An electrical circuit for approximating a polynomial function, the circuit comprising:

a. a signal receiving node for receiving a linear input signal having a predetermined range;

b. primary circuit means for generating an output electrical signal, comprising:

i. first transistor means, in electrical communication with the signal receiving node, for providing one operational range thereof that varies exponentially in response to the linear input signal, and for providing a second operational range thereof that varies linearly in response to the linear input signal; and ii. a first output node for outputting the output electrical signal;

c. secondary circuit means, operatively connected to said primary circuit means, for diverting a portion of the output signal, comprising:

i. second transistor means, in electrical communication with the signal receiving node, for providing one operational range thereof that varies exponentially in response to the linear input signal, and for providing a second operational range thereof that varies linearly in response to the linear input signal; and ii. a second output node, said first and second output nodes of the respective transistor means being commonly connected so that the operation of the primary and secondary circuit means together combine to form the graphically curved output response function.

24. An electrical circuit as recited in claim 23, wherein the output response function comprises a tunable and well-behaved parabolic function.

25. An electrical circuit as recited in claim 23, wherein the transistor means of each said circuit means comprises a plurality of discrete devices for biasing each said transistor means to obtain desired operating characteristics, and wherein the curvature of the output signal is selectable by varying the characteristics of the discrete devices.

26. An electrical circuit as recited in claim 23, wherein the first transistor means comprises at least one transistor, the at least one transistor being provided with the linear input signal and having a substantial exponential output signal responsive to a predetermined range of the linear input signal, the exponential output signal substantially assisting in shaping the curvature of the output response function.

27. An electrical circuit as recited in claim 23, further comprising:

a. means for establishing a lower limit of the linear input signal below which the output response function is not responsive;

b. means for establishing an upper limit of the linear input signal above which the output response function is not responsive; and c. means for establishing a peak amplitude of the output response function that is attained in response to a predetermined level of the input signal.

28. An electrical circuit as recited in claim 23, further comprising means for selectively varying the curvature of the output signal.

29. An electrical circuit as recited in claim 23, wherein the first transistor means of the primary circuit means comprises current reflecting means in electrical communication with the signal receiving node for generating a first electrical signal in response to the linear input signal, the graphically curved output response function corresponding to a scaled multiple of the first electrical signal, and wherein the current reflecting means comprises a current mirror comprising first and second transistors, with the linear input signal appearing on a current source terminal of the first transistor and the output response function appealing on a current source terminal of the second transistor.

30. An electrical circuit as recited in claim 29, wherein the second transistor means of the secondary circuit means comprises a third transistor, a current source terminal of the third transistor having a common connection with the current source terminal of the first transistor, thereby diverting current from the first transistor such that the output response function is gradually depleted.

31. An electrical circuit as recited in claim 30, wherein the secondary circuit means comprises a second current mirror, the second current mirror comprising the third transistor and a fourth transistor.

32. An electrical circuit as recited in claim 31, further comprising a resistor connected to the a current source terminal of the fourth transistor, wherein varying the resistor partially determines a level of the input current at which the second current mirror begins to conduct current, in order to determine a peak output of the curved output response function as well as to affect the curvature of the output response function.

33. An electrical circuit as recited in claim 29, further comprising a resistor connected to the current source terminal of the first transistor, and wherein varying the value of the resistor determines the level of the input signal at which the output response function begins.

34. An electrical circuit as recited in claim 23, further comprising means, electrically connected to at least one of either the primary or secondary circuit means, for determining the median point of the output response function.

35. An electrical circuit as recited in claim 29, wherein the amplitude of the curved output response function is determined by the relative size of the emitter areas of the first and second transistors.

36. An electrical circuit as recited in claim 23, wherein said first and second transistor means are comprised of bipolar junction transistors.

37. An electrical circuit as recited in claim 23, wherein said first and second transistor means are comprised of MOS transistors.

38. An electrical circuit as recited in claim 23, wherein the primary and secondary circuit means comprise a plurality of discrete devices, and wherein the curvature of the output signal is selectable by varying the characteristics of the discrete devices.

39. An electrical circuit as recited in claim 38, wherein at least a portion of the discrete devices comprise fusible link trimming resistors.

40. An electrical circuit as recited in claim 35, wherein at least one of the first and second transistors is a multiple emitter transistor, the multiple emitter having varying electrical characteristics, and wherein the amplitude of the output response function can be varied by selectively enabling the emitters of the multiple emitter transistor.

41. An electrical circuit as recited in claim 23, further comprising the use of a third transistor in the current mirror, a current source terminal of the third transistor being connected in series with the second transistor, the third transistor being enabled or disabled during operation of the electrical circuit such that a peak amplitude of the output response function can be selected during the operation of the electrical circuit.

42. An electrical circuit for approximating a polynomial function, the circuit comprising:

a. a signal receiving node for receiving a linear input signal;

b. a primary current mirror comprising a first and a second transistor, the first and second transistors each having a control terminal, the control terminals of the first and second transistor being connected in a common node, the primary current mirror having a primary current mirror output signal, the primary current mirror output signal being biased to operate exponentially over a substantial portion of the input signal and having a positive output over a predetermined range of the input signal with zero output over the remainder of the input signal, the primary current mirror output signal assisting to generate a graphically curved output response function; and c. means for diverting current from the primary current mirror output signal to further assist in shaping the output response function, the current diverting means generating a diversion current varying exponentially in response to at least a portion of the linear input signal, the diversion current operating with a positive output after a predetermined level of the linear input signal, and having zero output before the predetermined level of the linear input signal.

43. An electrical circuit as recited in claim 42, wherein at least one of either the primary current mirror or the means for diverting current further comprises:

a means for establishing a lower limit of the linear input signal below which the output response function is not responsive;

b. means for establishing an upper limit of the linear input signal above which the output response function is not responsive; and c. means for establishing a peak amplitude of the output response function that is attained in response to a predetermined level of the input signal.

44. An electrical circuit as recited in claim 43, further comprising means for selectively varying the roundness of the curvature of the output signal.

45. An electrical circuit as recited in claim 44, wherein the output signal generating means comprises a plurality of discrete devices, and wherein the curvature of the output signal is selectable by varying the characteristics of the discrete devices.

46. An electrical circuit as recited in claim 45, wherein the curved output response function comprises a well-behaved bounded parabolic function.

47. An electrical circuit as recited in claim 42 wherein the control terminals of the first and second transistors being connected in a common node with a current source terminal of the first transistor and being provided with the linear input signal at the common node.

48. An electrical circuit as recited in claim 42, wherein the current diverting means comprises a third transistor, a current source terminal of the third transistor having a common connection with a current source terminal of the first transistor, thereby diverting current from the first transistor such that the output response function is gradually depicted.

49. An electrical circuit as recited in claim 48, wherein the current diverting means comprises a second current mirror, the second current mirror comprising the third transistor and a fourth transistor, a current source terminal of the third transistor being connected in a common node with the current source terminal of the first transistor, thereby diverting the current from the first transistor and consequently from the control terminal of the second transistor.

50. An electrical circuit recited in claim 49, further comprising a control terminal on each of the third and fourth transistors, the control terminal of the third and fourth transistor being connected in a common node with the current source terminal of the fourth transistor and being provided with the input signal at the common node.

51. An electrical circuit as recited in claim 50, wherein the amplitude of the curved output response function is determined by the relative size of the emitter areas of the first and second transistors.

52. An electrical circuit as recited in claim 42, wherein the transistors employed in constructing the circuits are substantially comprised of bipolar junction transistors.

53. An electrical circuit as recited in claim 42, wherein the transistors employed in constructing the circuit are substantially comprised of MOS transistors.

54. An electrical circuit as recited in claim 45, wherein at least a portion of the discrete devices comprise fusible link trimming resistors.

55. An electrical circuit as recited in claim 45, wherein at least one of the first and second transistors is a multiple emitter transistor, the multiple emitter having varying electrical characteristics, and wherein the amplitude of the output response function can be varied by selectively enabling the emitters of the multiple emitter transistor.

56. An electrical circuit as recited in claim 42, further comprising the use of a third transistor in the primary current mirror the third transistor having a current source terminal connected in series with the second transistor, the third transistor being enabled or disabled during operation of the electrical circuit such that a peak amplitude of the output response function can be selected during the operation of the electrical circuit.

57. An electrical circuit for approximating a polynomial function, the circuit comprising:

a. a signal receiving node for receiving a linear input signal;

b. a primary current mirror comprising a first and a second transistor, the first and second transistors each having a control terminal, the control terminals of the first and second transistor being connected in a common node, the first transistor having a current service terminal in electrical communication with the signal receiving node, the primary current mirror having a primary current mirror output signal, the primary current mirror output signal being biased to operate exponentially over a substantial portion of the input signal and having a positive output over a predetermined range of the input signal with zero output over the remainder of the input signal, the primary current mirror output signal assisting to generate a graphically curved output response function;

c. a secondary current mirror comprising a third and fourth transistor, the third and a fourth transistors being connected at their bases with a second common node, the second common node being provided with the linear input signal, the secondary current mirror generating a diversion current varying at least initially exponentially in response to the linear input signal, the secondary current mirror beginning conduction at a predetermined level of the linear input signal and having zero output previous to the predetermined level, the diversion current appearing on a current source terminal of the third transistor, the third transistor current source terminal being connected in common with the current source terminal of the first transistor, such that the diversion current diverts current from the primary current mirror and causes the output response function to be gradually depleted and thereby result in the shape of a substantially symmetrical parabola with an upward curve beginning at a lower limit and ending at a peak corresponding to a maximum value and a downward curve beginning at the peak and returning to zero at an upper limit;

d. first resistor varying means for establishing a lower limit of the linear input signal below which the primary and secondary current mirrors are not responsive;

e. second resistor varying means for establishing an upper limit of the linear input signal above which the primary and secondary current mirrors are not responsive;

f. third resistor varying means for establishing a maximum value which is not exceeded by the output signal.

58. An electrical circuit as recited in claim 57, wherein one of the first and second resistor varying means comprises a multiple link fuse resistor.

59. An electrical circuit as recited in claim 57 further comprising emitter area scaling means for selectively varying the curvature of the output signal response.

60. An electrical circuit as recited in claim 57, wherein at least one of either the primary current mirror or the secondary current mirror comprises a multiple emitter transistor.

61. An electrical circuit as recited in claim 60, wherein the multiple emitter transistor is provided with multiple link fusing.

62. An electrical circuit as recited in claim 57, further comprising the use of a fifth transistor in the primary current mirror, the fifth transistor having a current source terminal connected in a common node with the current source terminal of the second transistor, the second and fifth transistors each having a current output terminal and at least one of either the second transistor or the fifth transistor having a switching transistor located across the current output terminal, the switching transistors being adapted to be enabled or disabled during operation of the electrical circuit such that the peak amplitude of the output response function can be selected during the operation of the electrical circuit.

63. An electrical circuit as recited in claim 59, wherein the emitter scaling means comprises a multiple link fuse resistor.

* * * * *

UNITED STATES PATENT AND TRADEMARK OFFICE

CERTIFICATE OF CORRECTION

PATENT NO. : 5,714,902

DATED : Feb. 3, 1998

INVENTOR(S) : Donald T. Comer

It is certified that error appears in the above-identified patent and that said Letters Patent is hereby corrected as shown below:

Col. 1, line 52, after "These" change "well" to --will--

Col. 2, line 55, after "to" change "tone" to --tune--

Col. 3, line 60, after "of" delete --the--

Col. 4, line 62, after "certain" delete --of the--

Col. 5, line 23, after "curve" change "firing" to --fitting--

Col. 5, line 48, before "a" delete --will be illustrated--

Col. 7, line 40, after "resistor" change "RR1" to --R1--

Col. 7, line 43, after "both" delete --of--

Col. 8, line 48, after "node" change "24" to --20--

Col. 9, line 32, after "to" delete --in--

Col. 10, line 35, after "current" change "minor" to --mirror--

Col. 10, line 40, before "could" change "tun" to --turn--

Col. 10, line 58, after "generation" change "era" to --of a--

Col. 11, line 15, after "certain" delete --of--

UNITED STATES PATENT AND TRADEMARK OFFICE
CERTIFICATE OF CORRECTION

PATENT NO. : 5,714,902

DATED : Feb. 3, 1998

INVENTOR(S) : Donald T. Comer

It is certified that error appears in the above-identified patent and that said Letters Patent is hereby corrected as shown below:

Col. 12, line 66, before "electrical" change "All" to --An--

Col. 13, line 25, change "depicted" to --depleted--

Col. 13, line 40, after "affecting" insert --the curvature of--

Col. 13, line 50, after "of" delete --the--

Col. 13, line 60, after "of" delete --the--

Col. 14, line 60, after "transistor," delete --the--

Col. 15, line 23, after "function" change "appealing" to --appearing--

Col. 16, line 49, after "the" continue with line 50

Col. 17, line 11, after "gradually" change "depicted" to --depleted--

Signed and Sealed this

First Day of December, 1998

*Attest:*

BRUCE LEHMAN

*Attesting Officer*

*Commissioner of Patents and Trademarks*